US012656566B2

(12) United States Patent
Giraud

(10) Patent No.: US 12,656,566 B2
(45) Date of Patent: Jun. 16, 2026

(54) CABLE PROTECTION ASSEMBLY FOR FIBER OPTIC DISTRIBUTION CABINETS

(71) Applicant: CORNING RESEARCH & DEVELOPMENT CORPORATION, Corning, NY (US)

(72) Inventor: William Julius Mcphil Giraud, Azle, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 274 days.

(21) Appl. No.: 18/536,369

(22) Filed: Dec. 12, 2023

(65) Prior Publication Data

US 2024/0219668 A1 Jul. 4, 2024

Related U.S. Application Data

(60) Provisional application No. 63/436,169, filed on Dec. 30, 2022.

(51) Int. Cl.
G02B 6/44 (2006.01)
H02G 3/08 (2006.01)

(52) U.S. Cl.
CPC ........... G02B 6/4452 (2013.01); H02G 3/083 (2013.01); G02B 6/4446 (2013.01); G02B 6/44524 (2023.05)

(58) Field of Classification Search
CPC .... G02B 6/4452; G02B 6/44524; H02G 3/08; H02G 3/083
See application file for complete search history.

(56) References Cited

U.S. PATENT DOCUMENTS

| | | | |
|---|---|---|---|
| 4,372,511 A * | 2/1983 | Knowles .............. | G02B 6/4439 403/41 |
| 5,100,221 A | 3/1992 | Carney et al. | |
| 6,379,166 B1 * | 4/2002 | Hagarty ................ | G02B 6/477 439/135 |
| 6,711,339 B2 * | 3/2004 | Puetz ................. | G02B 6/44528 385/135 |
| 6,951,986 B1 | 10/2005 | Weinert et al. | |
| 7,208,676 B2 | 4/2007 | VanderVelde | |
| 8,238,709 B2 | 8/2012 | Solheid et al. | |
| 10,048,452 B1 | 8/2018 | Hangebrauck et al. | |
| 2005/0111810 A1 * | 5/2005 | Giraud .............. | G02B 6/44526 385/135 |
| 2007/0230889 A1 * | 10/2007 | Sato ..................... | G02B 6/4455 385/134 |
| 2009/0047828 A1 * | 2/2009 | Sparrowhawk ........ | H02G 3/083 439/535 |

(Continued)

FOREIGN PATENT DOCUMENTS

| | | |
|---|---|---|
| DE | 19906206 A1 | 8/2000 |
| WO | 00/49443 A1 | 8/2000 |

OTHER PUBLICATIONS

Extended European Search Report, EP application No. 23217703.0, Dated May 17, 2024, 7 pages, European Patent Office.

*Primary Examiner* — Michael Stahl
(74) *Attorney, Agent, or Firm* — Kapil U. Banakar

(57) ABSTRACT

In general, the present disclosure relates to a cable protection assembly for use on distribution cabinets and the corresponding methods of assembling the cable protection assembly onto the distribution cabinets.

20 Claims, 14 Drawing Sheets

(56) References Cited

U.S. PATENT DOCUMENTS

| | | |
|---|---|---|
| 2009/0196564 A1 | 8/2009 | Owens et al. |
| 2021/0181430 A1 | 6/2021 | Van Baelen et al. |
| 2021/0410310 A1 | 12/2021 | Castleberry et al. |

* cited by examiner

CABLE PROTECTION ASSEMBLY FOR FIBER OPTIC DISTRIBUTION CABINETS

PRIORITY APPLICATION

This application claims the benefit of priority of U.S. Provisional Application No. 63/436,169, filed on Dec. 30, 2022, the content of which is relied upon and incorporated herein by reference in its entirety.

FIELD

The technology of the disclosure relates to cable protection assemblies and more particularly, to cable protection assemblies for use with distribution cabinets.

BACKGROUND

Cabinets may be used to enclose and protect equipment, such as, for example, fiber optic equipment associated with fiber optic cables including optical fibers. For example, fiber optic equipment may be enclosed in cabinets and provide connections and circuitry for facilitating broadband voice, video, and data transmission. One example of a cabinet for enclosing fiber optic equipment is a fiber optic distribution outdoor cabinet, some of which may be intended to be installed in an outdoor environment exposed to the elements. In order to substantially prevent moisture and dust from the environment from entering the interior of the cabinet, some cabinets include a seamless single-piece shell.

In these applications, fiber optic cables extend exteriorly from the cabinets and can be exposed to the environment. This leaves the fiber optic cables susceptible to damage from external factors, such as human interaction, animal interaction, or from accidental damage (e.g., weather, etc.).

As such there is a need to provide protection to the exposed cables that extend from the outdoor cabinets.

SUMMARY

In general, the present disclosure relates to a cable protection assembly for use on distribution cabinets and the corresponding methods of assembling the cable protection assembly onto the distribution cabinets.

In one embodiment, a cable protection assembly configured to connect to a cabinet is provided. The cable protection assembly comprising: a cable protector having a front wall, a first side wall, a second side wall, and a bottom wall, wherein one of the first side wall and the second side wall has a removable plate to create a first opening within the cable protector; a rear wall coupled to the cable protector to define an inner cavity of the cable protector, wherein the rear wall has a removable plate to create a second opening within the rear wall; a directional spout coupled to the rear wall, the directional spout having a first portion with a first aperture and a first axis and a second portion with a second aperture and a second axis, wherein the directional spout includes a passageway that extends between the first aperture and the second aperture and that is in communication with the inner cavity of the cable protector; and wherein the first axis and the second axis are angled with respect to one another.

In another embodiment, the front wall, the first side wall, the second side wall, and the rear wall define a top rim, wherein the top rim is configured to be coupled to a bottom surface of a cabinet. In another embodiment, the first axis and the second axis are substantially perpendicular to each other. In another embodiment, the first portion of the directional spout couples to the rear wall at the second opening within the real wall. In another embodiment, the second portion and the second aperture are positioned such that the second portion and the second aperture are directed in a direction away from the cabinet when the cable protection assembly is connected to the cabinet. In another embodiment, the second portion and the second aperture are positioned such that the second portion and the second aperture are directed in a direction towards the cabinet when the cable protection assembly is connected to the cabinet.

In one embodiment, a cable protection assembly configured to connect to a cabinet is provided. The cable protection assembly comprising: a cable protector having a front wall, a first side wall, a second side wall, and a bottom wall, wherein one of the first side wall and the second side wall has a removable plate to create a first opening within the cable protector; a rear wall coupled to the cable protector to define an inner cavity of the cable protector, wherein the rear wall has a removable plate to create a second opening within the rear wall; a directional spout coupled to one of the first side wall and the second side wall, the directional spout having a first portion with a first aperture and a first axis and a second portion with a second aperture and a second axis, wherein the directional spout includes a passageway that extends between the first aperture and the second aperture and that is in communication with the inner cavity of the cable protector; and wherein the first axis and the second axis are angled with respect to one another.

In another embodiment, the front wall, the first side wall, the second side wall, and the rear wall define a top rim, wherein the top rim is configured to be coupled to a bottom surface of a cabinet. In another embodiment, the first axis and the second axis are substantially perpendicular to each other. In another embodiment, the first portion of the directional spout couples to one of the first side wall and the second side wall at the first opening of one of the first side wall and the second side wall when the cable protection assembly is connected to the cabinet. In another embodiment, the second portion and the second aperture are positioned such that the second portion and the second aperture are directed in a direction away from the cabinet when the cable protection assembly is connected to the cabinet. In another embodiment, the second portion and the second aperture are positioned such that the second portion and the second aperture are directed in a direction towards the cabinet when the cable protection assembly is connected to the cabinet.

In one embodiment, a method of assembling a cable protection assembly is provided. The method comprising: coupling a cable protector to a distribution cabinet; coupling a rear wall to the distribution cabinet; and coupling a directional spout to one of the rear wall and the cable protector.

In another embodiment, the method, further comprising: orienting the directional spout prior to coupling the directional spout to one of the rear wall and the cable protector; wherein the directional spout comprises: a first portion with a first aperture and a second portion with a second aperture, wherein the directional spout includes a passageway that extends between the first aperture and the second aperture. In another embodiment, the second portion and the second aperture are positioned such that the second portion and the second aperture are directed in a direction away from the bottom wall. In another embodiment, the second portion and the second aperture are positioned such that the second portion and the second aperture are directed in a direction towards the bottom wall. In another embodiment, the cable protector has a front wall, a first side wall, a second side wall, and a bottom wall, wherein one of the first side wall and the second side wall has a removable plate to create a first opening within the cable protector; and wherein the rear wall couples to the cable protector to define an inner cavity of the cable protector, wherein the rear wall has a removable plate to create a second opening within the rear wall. In another embodiment, the method, further comprising: directing a cable from the distribution cabinet through the cable protector and through the directional spout. In another embodiment, the method, further comprising: applying a cable covering onto an uncovered portion of the cable. In another embodiment, the first portion of the directional spout couples to the rear wall at the second opening within the real wall. In another embodiment, the directional spout is coupled to one of the first side wall and the second side wall such that the first portion of the directional spout couples to one of the first side wall and the second side wall at the first opening of one of the first side wall and the second side wall.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Various embodiments will be clarified by examples in the description below. In general, the present disclosure relates to a cable protection assembly for use on distribution cabinets and the corresponding methods of assembling the cable protection assembly onto the distribution cabinets.

Figure 1:
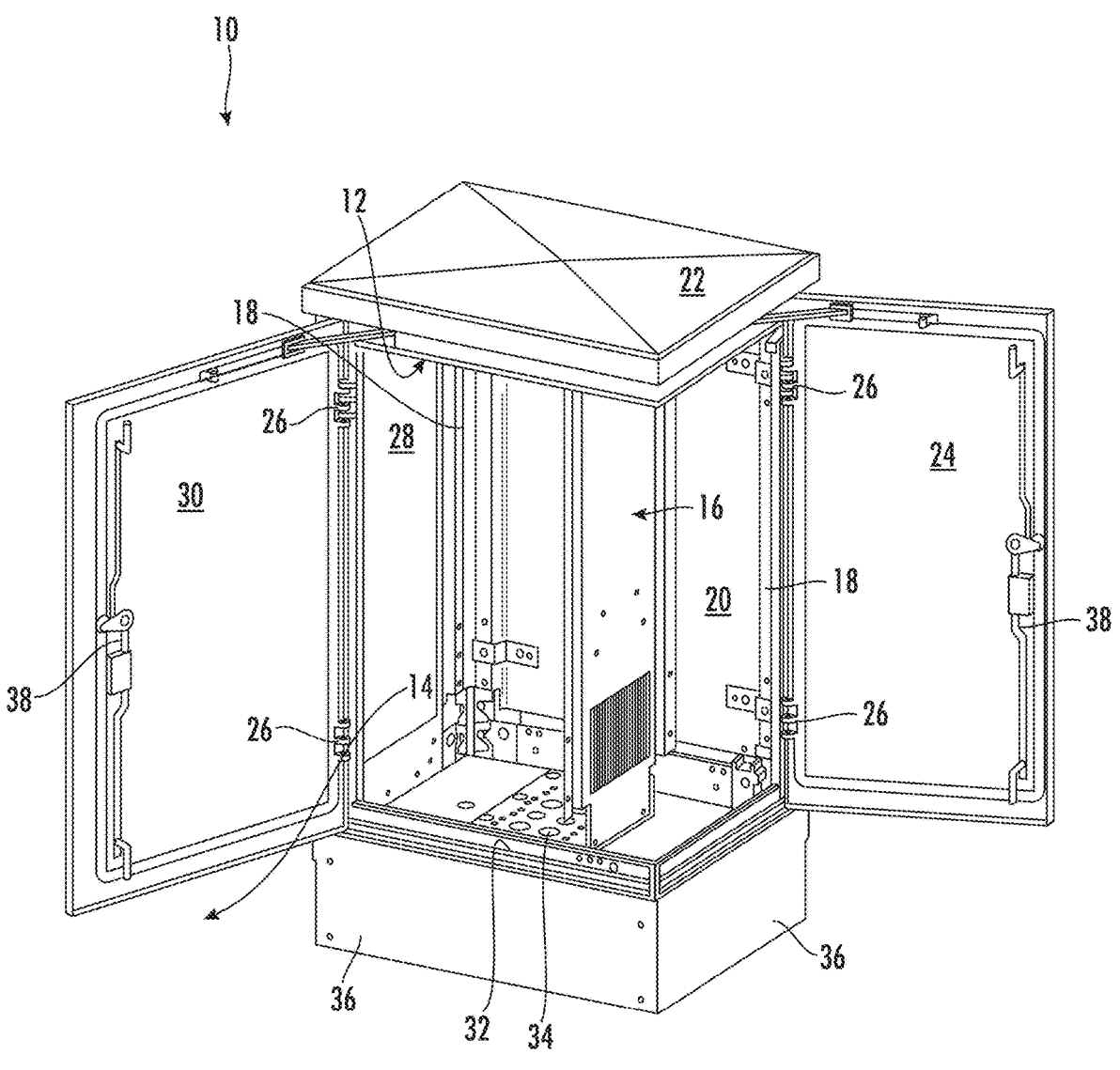
FIG. 1 is a perspective view of an example distribution cabinet.
Figure 1A:
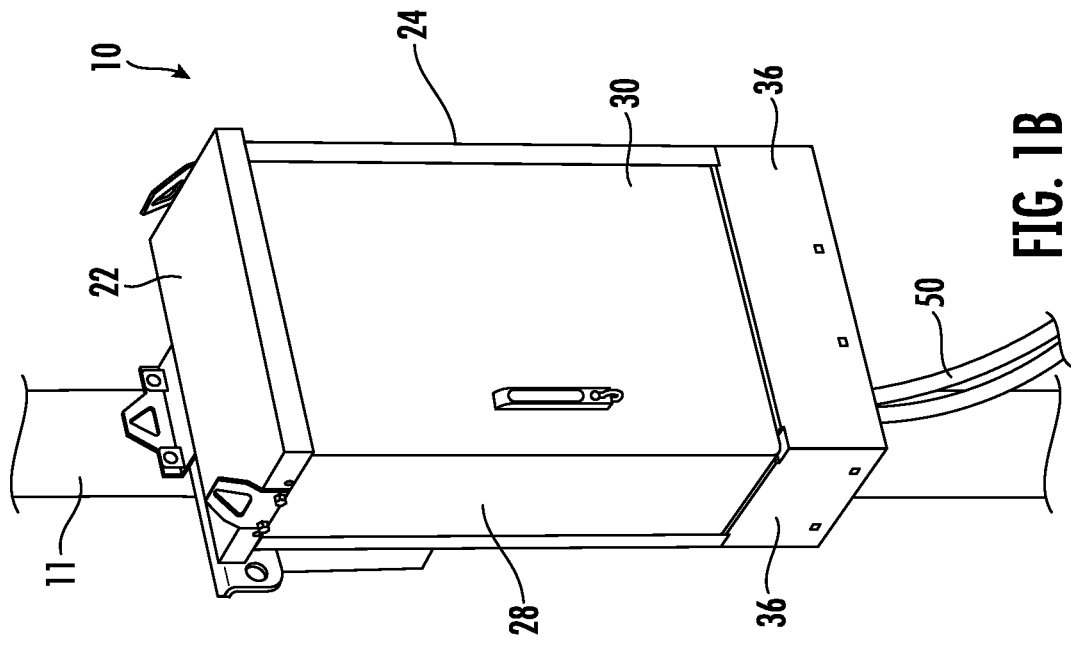
FIGS. 1A and 1B are perspective views of a distribution cabinet that is side mounted and center mounted, respectively, onto a pole in accordance with the present disclosure.
Figure 1B:
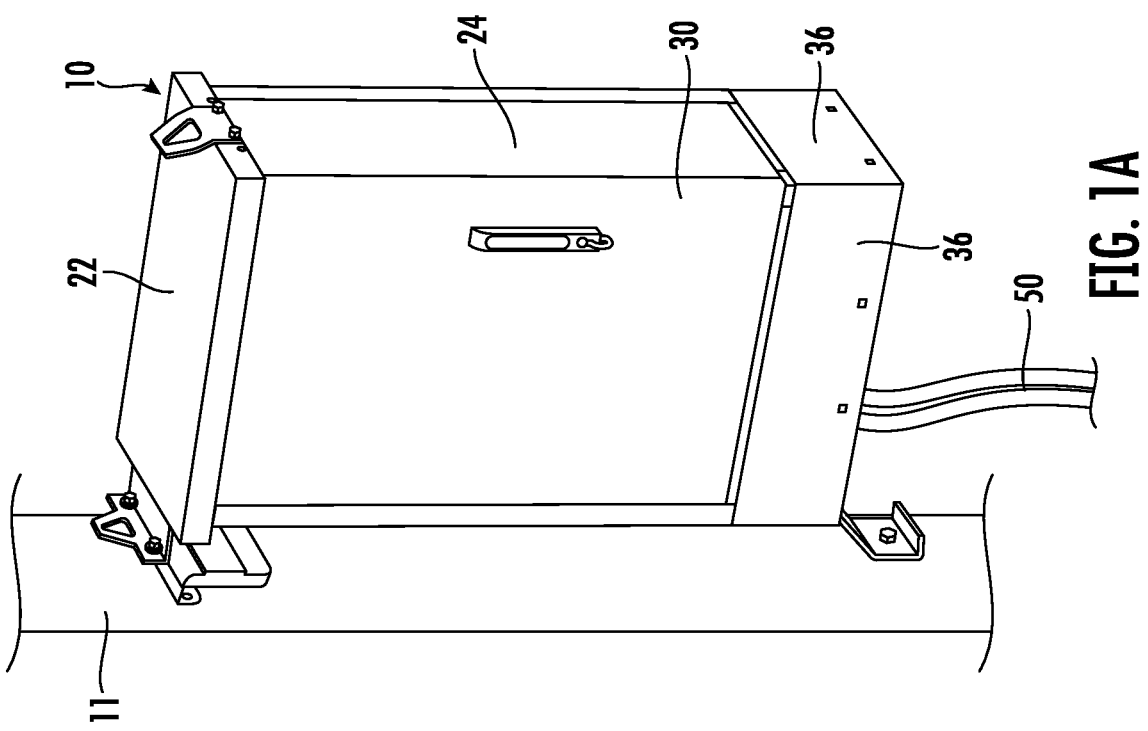
Figure 2A:
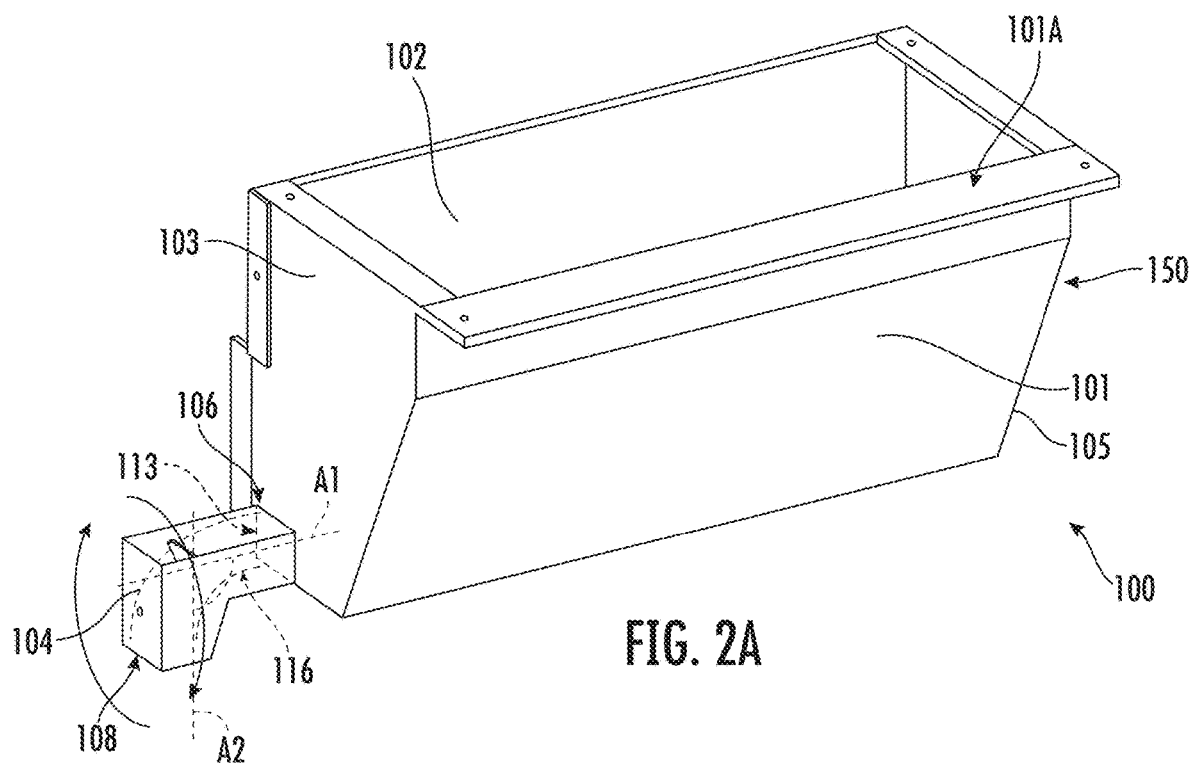
FIG. 2A is a perspective view of a cable protection assembly to be used with the distribution cabinet of FIGS. 1A and 1B in accordance with the present disclosure.
Figure 2B:
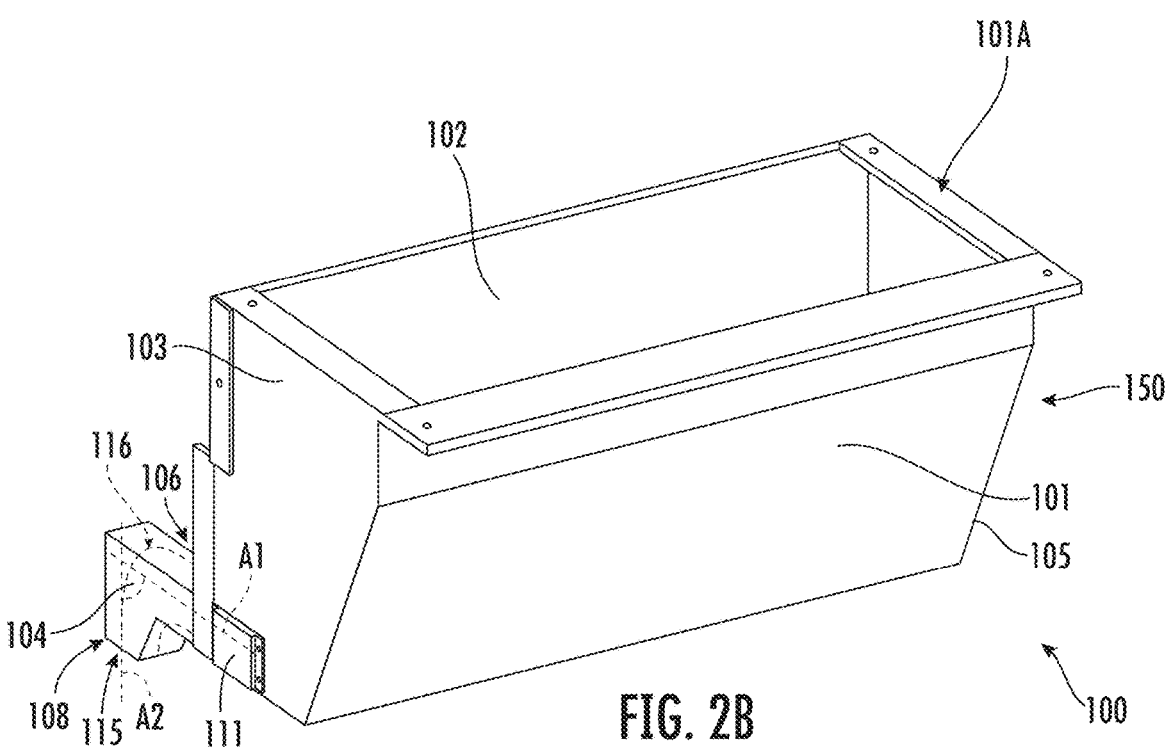
FIG. 2B is a perspective view of an alternate configuration of the cable protection assembly of FIG. 2A in accordance with the present disclosure.
Figure 2C:
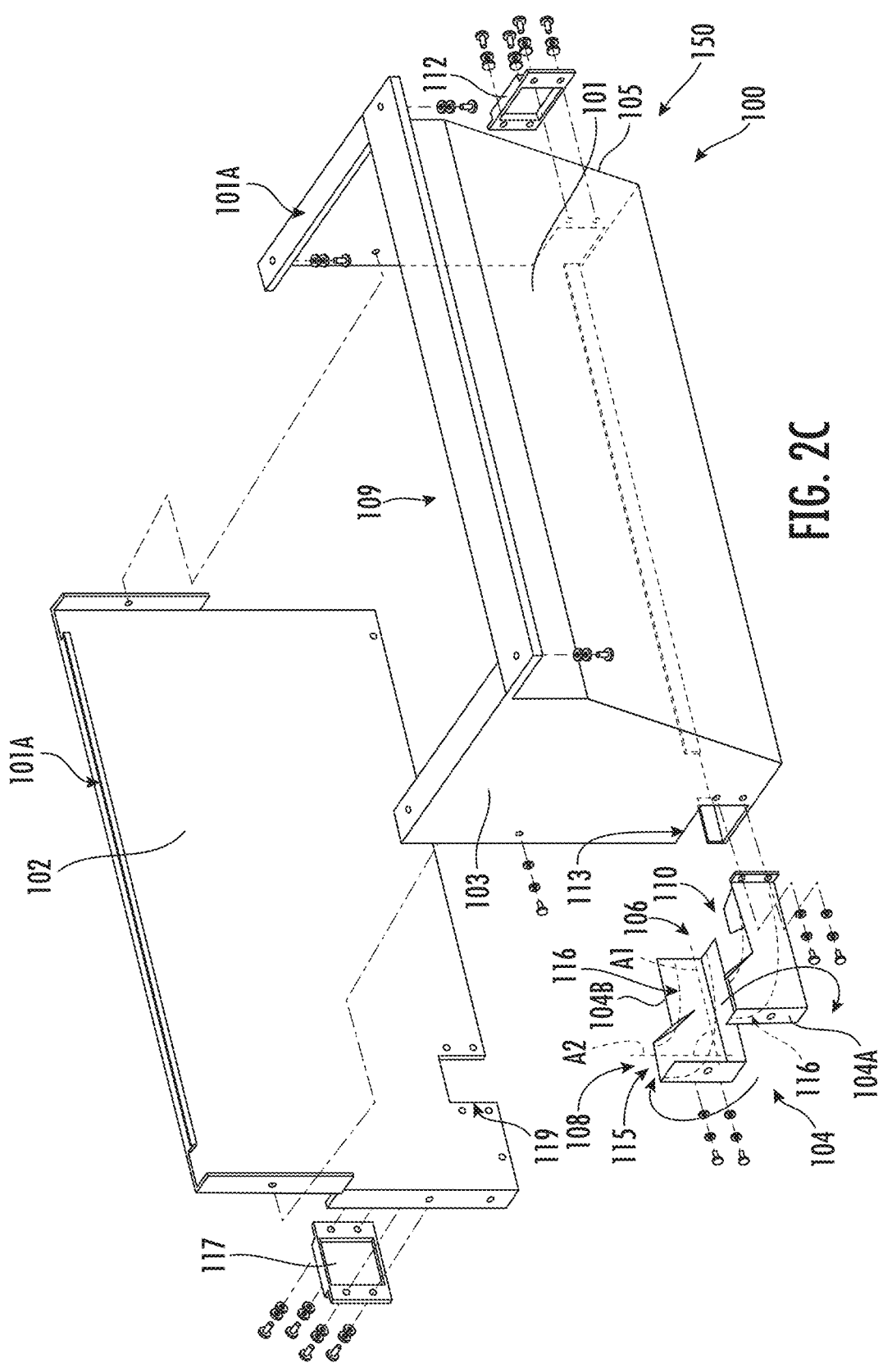
FIG. 2C is an exploded view of the cable protection assembly of FIG. 2A in accordance with the present disclosure.
Figure 2D:
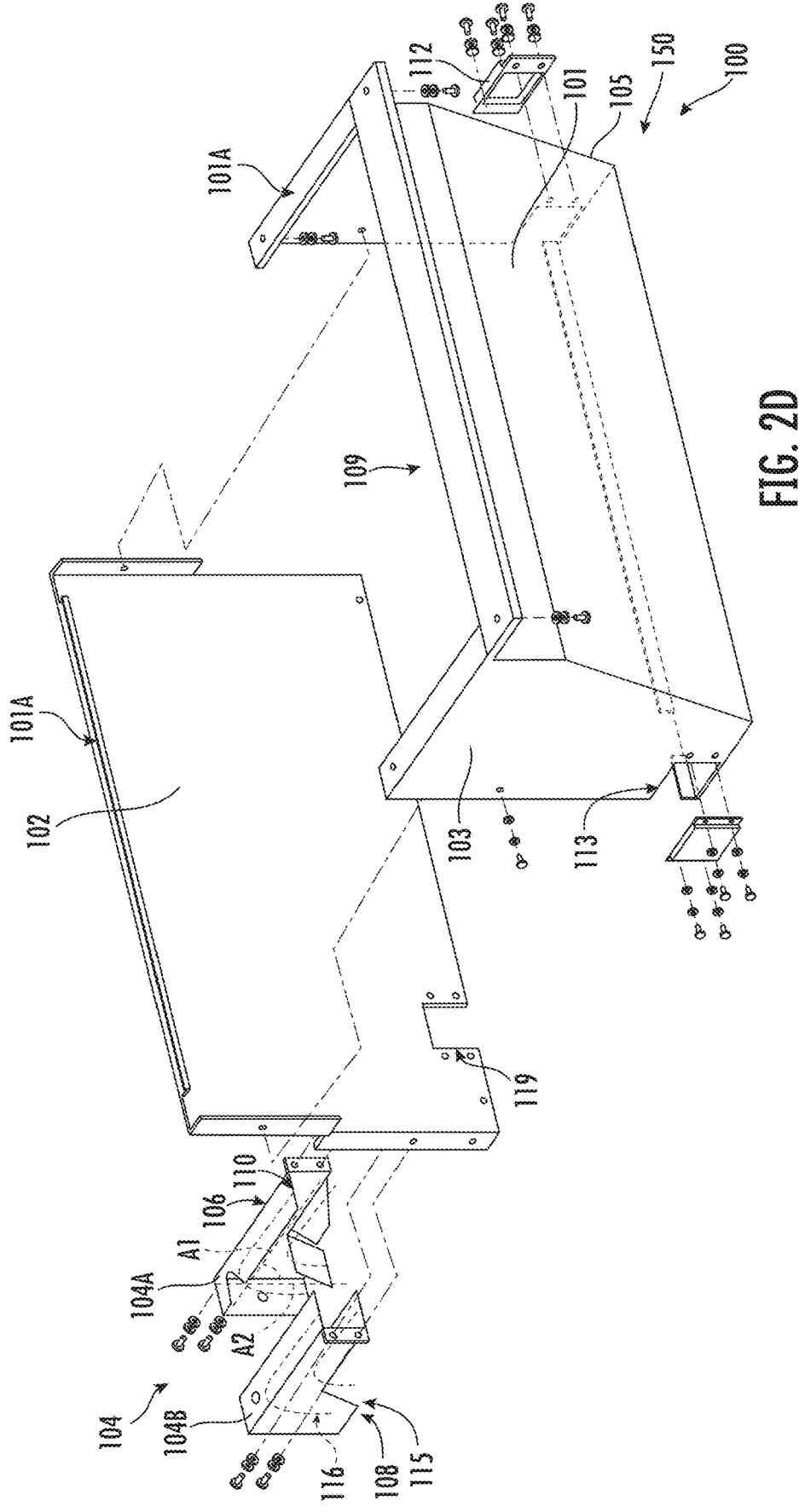
FIG. 2D is an exploded view of the cable protection assembly of FIG. 2B in accordance with the present disclosure.
Figure 3:
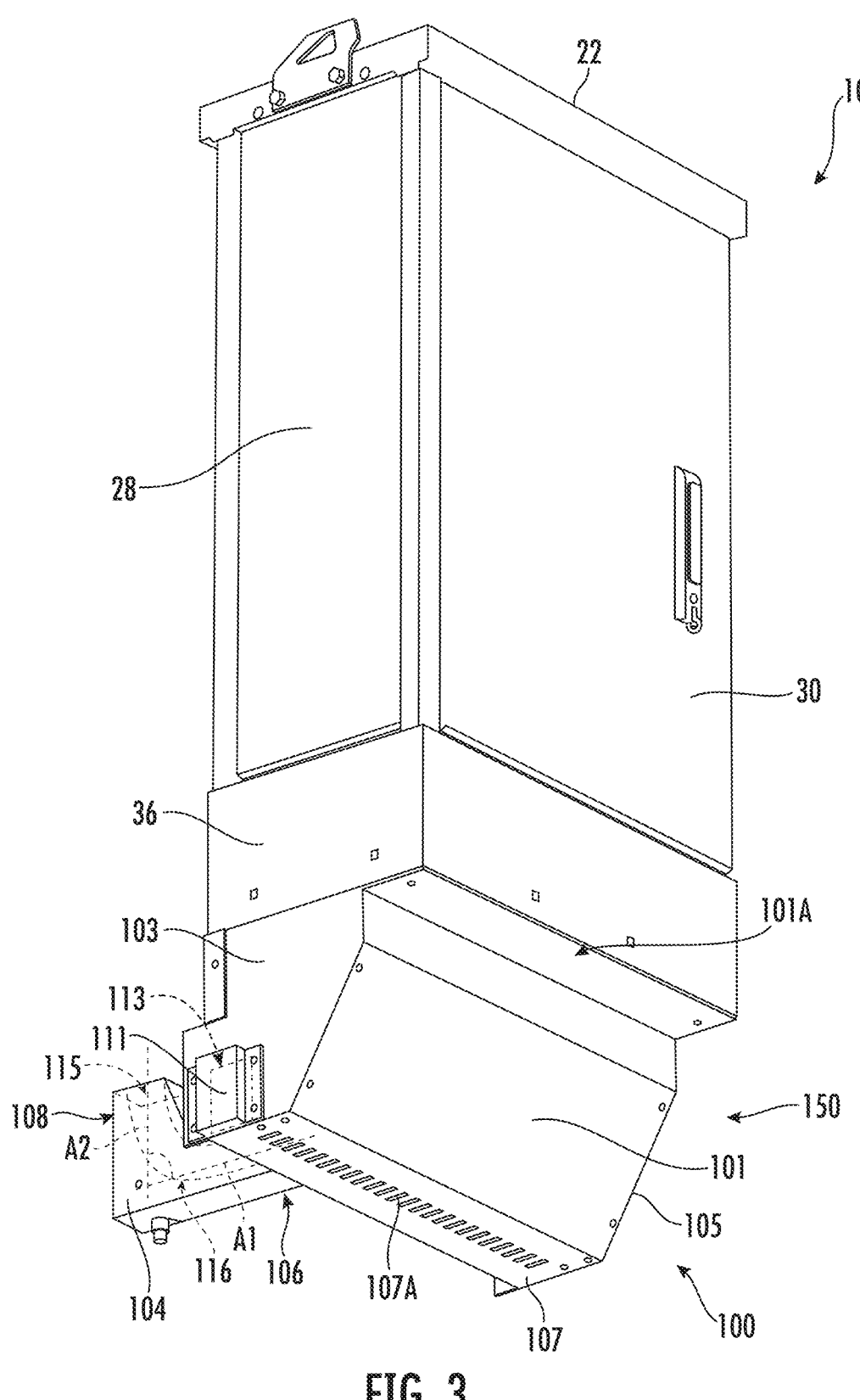
FIG. 3 is a bottom, perspective view of the distribution cabinet shown in FIGS. 1A and 1B with the cable protection assembly of FIG. 2A attached to the distribution cabinet in accordance with the present disclosure.

FIGS. 1A and 1B are perspective views of an example cabinet 10 mounted on a pole 11. The cabinet 10 is configured to enclose fiber optic equipment, such as fiber optic cables including optical fibers, and connections and circuitry for facilitating broadband voice, video, and data transmission. In some examples, the cabinet 10 may be a fiber optic distribution outdoor cabinet, which may be intended to be installed in an outdoor environment exposed to the elements. Other types of cabinets for enclosing other types of equipment are contemplated.

As shown in FIG. 1, the example cabinet 10 defines an interior 12 and an exterior 14. In the example shown, the interior 12 includes various structures 16 known to those skilled in the art for facilitating routing and/or connection of fiber optic cables including optical fibers (not shown for clarity). The example cabinet 10 shown includes a frame 18 and a plurality of exterior panels secured to the frame 18 for enclosing the interior 12 of the cabinet 10. For example, the cabinet 10 includes a back panel 20 coupled to a back side of the frame 18, a top panel 22 coupled to a top side of the frame 18, a first door panel 24 coupled to a first side of the frame 18 via one or more hinges 26, such that it pivots with respect to the frame 18, a second side panel 28 coupled to a second side of the frame 18 opposite the first door panel 24, a second door panel 30 coupled to a front side of the frame 18 via one or more hinges 26, such that it pivots with respect to the frame 18. In some examples, the cabinet 10 also includes a bottom panel 32 coupled to a bottom side of the frame 18. In some examples, the bottom panel 32 may include apertures 34 facilitating entry of cables, such as, for example, fiber optic cables, into the interior 12 of the cabinet 10. The example shown also includes a skirt 36 coupled to and extending around the periphery of the bottom of the frame 18.

As shown in FIG. 1, one or more of the first door panel 24 or the second door panel 30 may include a latch mechanism 38 for securing the first and/or second door panels 24 and 30 in the closed position. In some embodiments, the latch mechanisms 38 can include an upper door latch and a lower door latch that is configured to selectively engage and disengage respective upper and lower corner brackets, for example.

As shown in FIGS. 1A and 1B, cabinet 10 includes cables 50 that extend from the bottom of cabinet 10. In particular, cables 50 extend from a bottom surface 39 (FIG. 4A) of cabinet 10 and beyond skirt 36. When cables 50 extend beyond skirt 36, cables 50 are exposed and can be damaged. As such, a cable protection assembly 100 and corresponding coverings can be attached to cabinet 10 to reduce the exposure of cables 50 as discussed below.

Referring now to FIGS. 2A-2D, cable protection assembly 150 is shown. Cable protection assembly 150 comprises a cable protector 100, a rear wall 102, and a directional spout 104. Cable protector 100 comprises a front wall 101, side walls 103, 105, and a bottom wall 107. Front wall 101, side walls 103, 105, and bottom wall 107 partially define an inner cavity 109 as discussed in greater detail below. In addition, front wall 101, side walls 103, 105, and bottom wall 107 define a top rim 101A that is configured to couple to a bottom surface 39 of cabinet 10. As shown, front wall 101 faces the same general direction as door panel 30.

In addition, side walls 103, 105 are coupled to front wall 101, and at least one of side walls 103, 105 includes a removable plate 111, 112 that is coupled to side walls 103, 105, respectively. Removable plates 111, 112 are removable to create opening 113, 114 on side walls 103, 105 that leads into inner cavity 109. As discussed in greater detail below, when removable plate 111 is removed from side wall 103, a directional spout 104 can be coupled onto side wall 103 and cables 50 can be routed from inner cavity 109 and through directional spout 104.

Bottom wall 107 includes a plurality of vents 107A that are configured to enable drainage of liquid from inner cavity 109 of cable protector 100.

As shown in at least FIGS. 2A-2D, rear wall 102 couples to the cable protector 100 to define inner cavity 109. Similar to side walls 103, 105, rear wall 102 comprises a removable plate 117. Similar to removable plates 111, 112, removable plate 117 is removable to create an opening 119 on rear wall 102 that leads into inner cavity 109. As discussed in greater detail below, when removable plate 117 is removed from rear wall 102, a directional spout 104 can be coupled onto side wall 103 and cables 50 can be routed from inner cavity 109 and through directional spout 104.

Directional spout 104 is configured to couple to either rear wall 102 or side walls 103, 105 and to provide a passageway to direct cables 50 from inner cavity 109. Directional spout 104 comprises a first half 104A and a second half 104B that are coupled together to form directional spout 104. Directional spout 104 also comprises a first portion 106 and a second portion 108. As shown, first portion 106 comprises a first aperture 110 and a first axis A1, and second portion 108 comprises a second aperture 115 and a second axis A2. First aperture 110 and second aperture 115 are connected to each other by passageway 116 that extends throughout directional spout 104 as shown. As discussed in greater detail herein, first portion 106 couples to rear wall 102 or side walls 103, 105 to connect passageway 116 with inner cavity 109 via corresponding openings 113, 114, 119 such that cables 50 can be routed through inner cavity 109 and passageway 116.

As shown, first axis A1 and second axis A2 are angled with respect to each other. In some embodiments, first axis A1 is substantially perpendicular to second axis A2. However, it is within the scope of the present disclosure that alternate suitable angles between first axis A1 and second axis A2 may be used.

As discussed in greater detail herein, directional spout 104 is reversible in orientation. That is, depending on the desired configuration with cable protection assembly 150, directional spout 104 can be rotated about first axis A1 to change the orientation of second portion 108. In particular, directional spout 104 can have an orientation where second aperture 115 is directed in a direction towards cabinet 10 or directional spout 104 can have an orientation where second aperture 115 is directed in a direction away from cabinet 10 by rotating directional spout 104 about first axis A1.

Figure 4A:
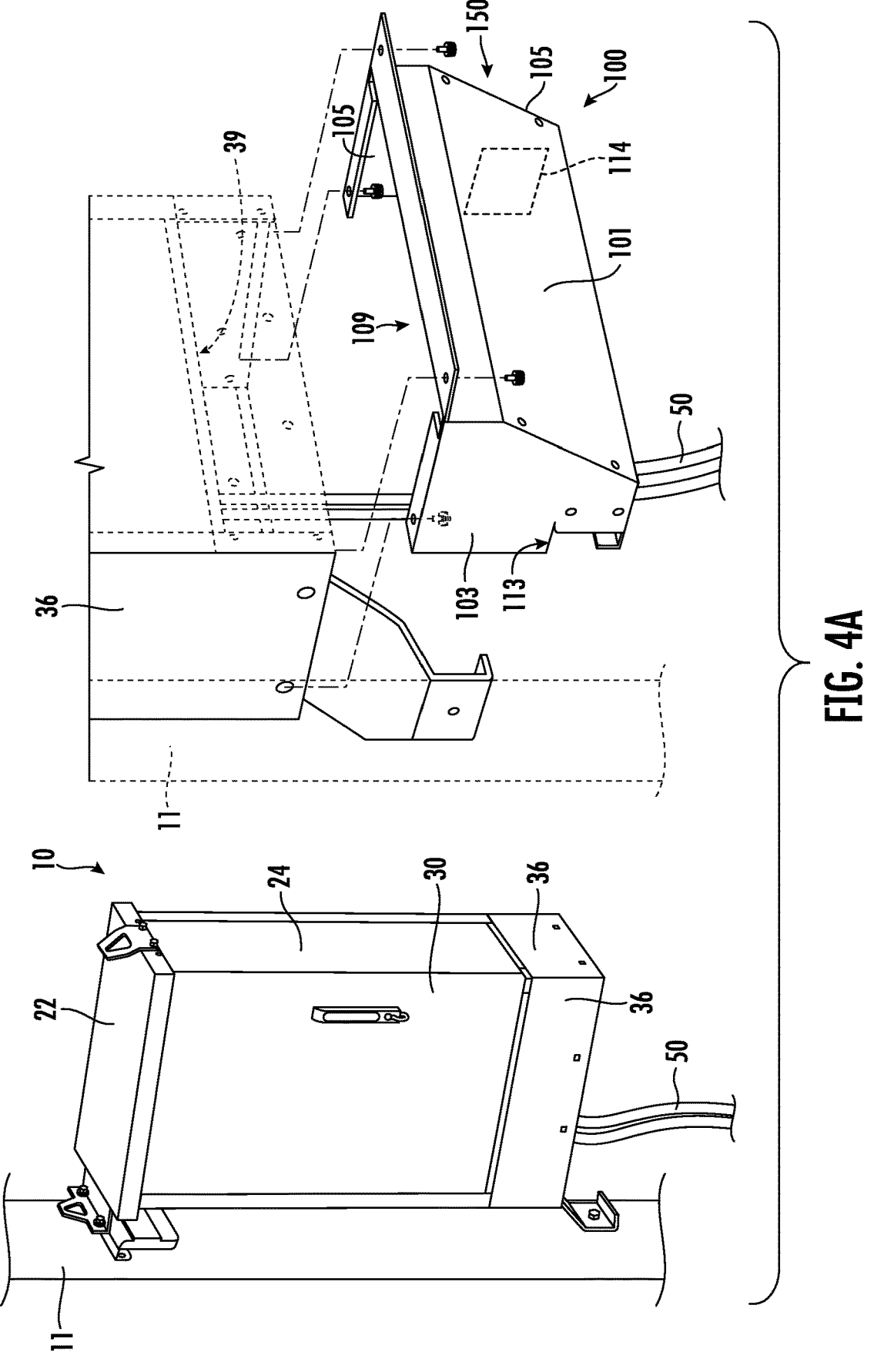
FIGS. 4A-4E illustrate a method of assembling the cable protection assembly of FIG. 2A onto the distribution cabinet of FIG. 3 in accordance with the present disclosure.
Figure 4B:
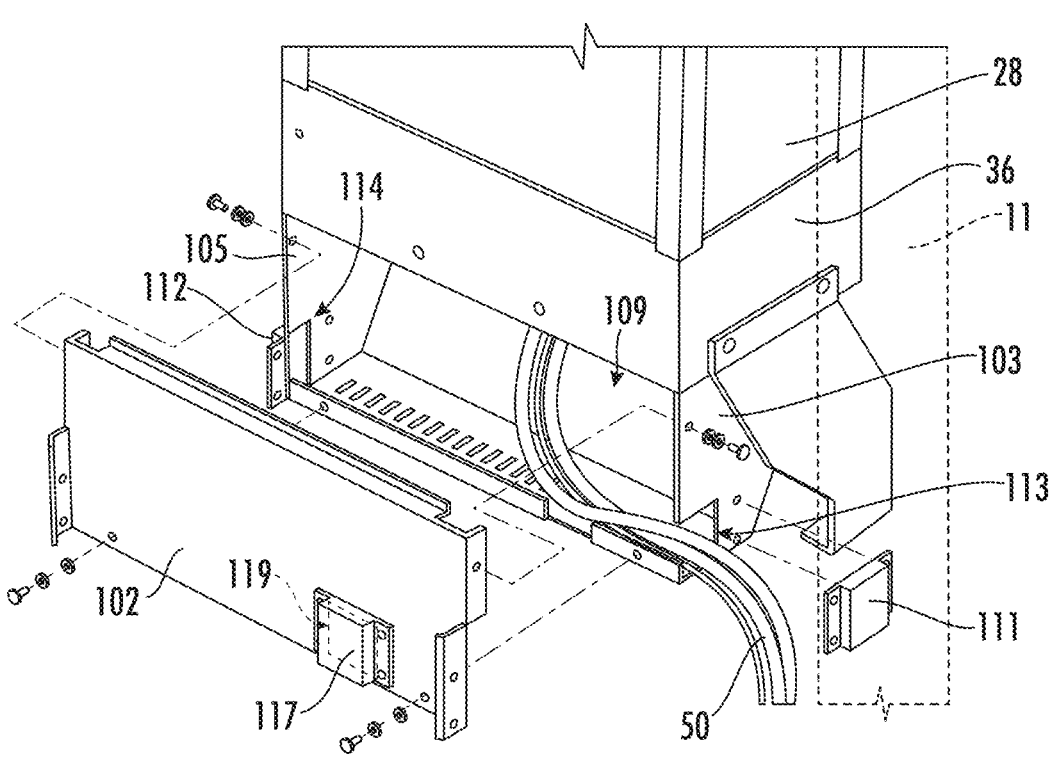

Referring now to FIGS. 4A-4E, a method of assembling cable protection assembly 150 and connecting cable protection assembly 150 to cabinet 10 is shown. Referring first to FIG. 4A, cabinet 10 is side mounted onto pole 11. As shown, cables 50 are extending downward from cabinet 10, and front wall 101 of cable protector is coupled to cabinet 10. In particular, a portion of top rim 101A that is defined by front wall 101 is coupled to cabinet 10. Then, as shown in FIG. 4B, removable plate 111 is removed from side wall 103 to provide opening 113 through which cables 50 are then directed through. Rear plate 102 is then coupled to front wall 101 to define inner cavity 109 as mentioned previously.

Figure 4C:
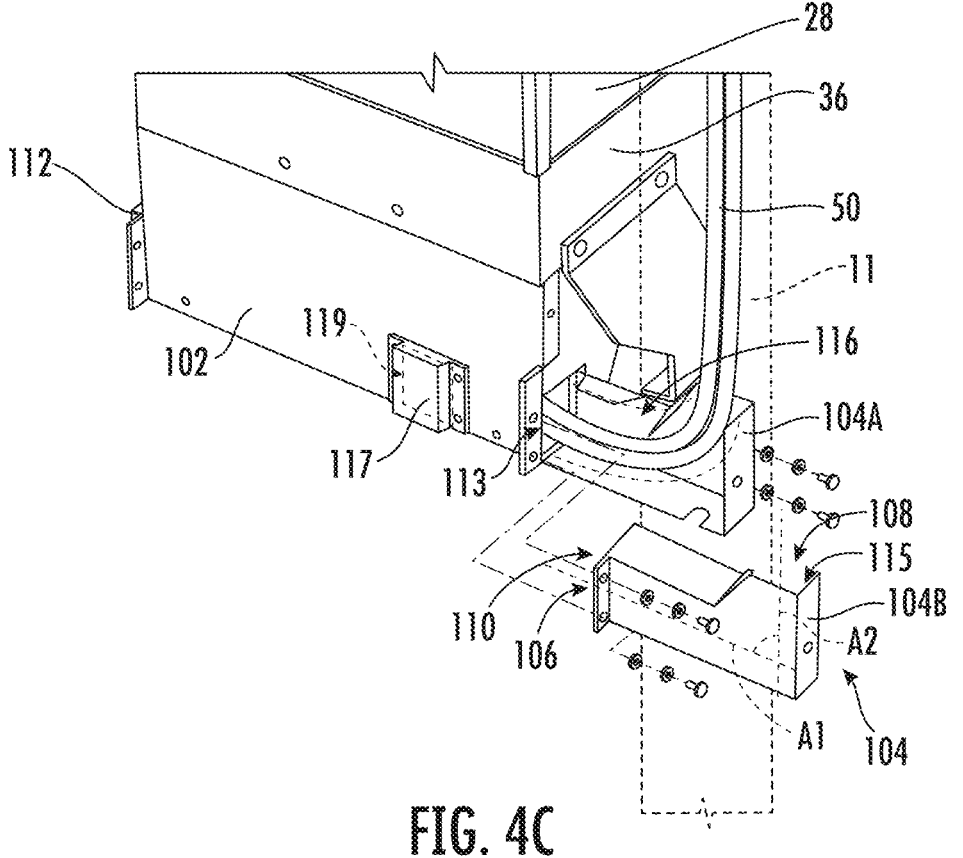
Figure 4D:
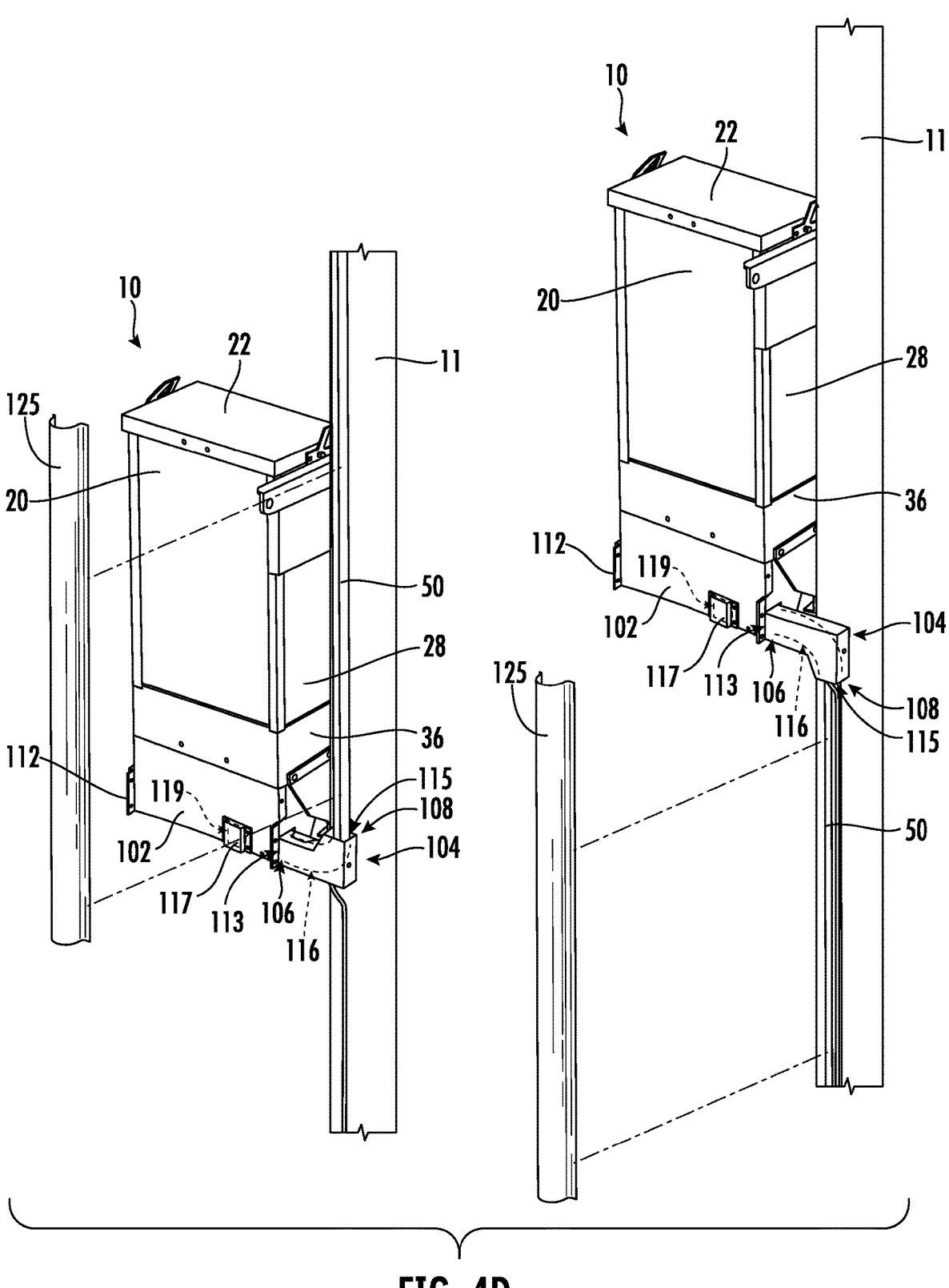
Figure 4E:
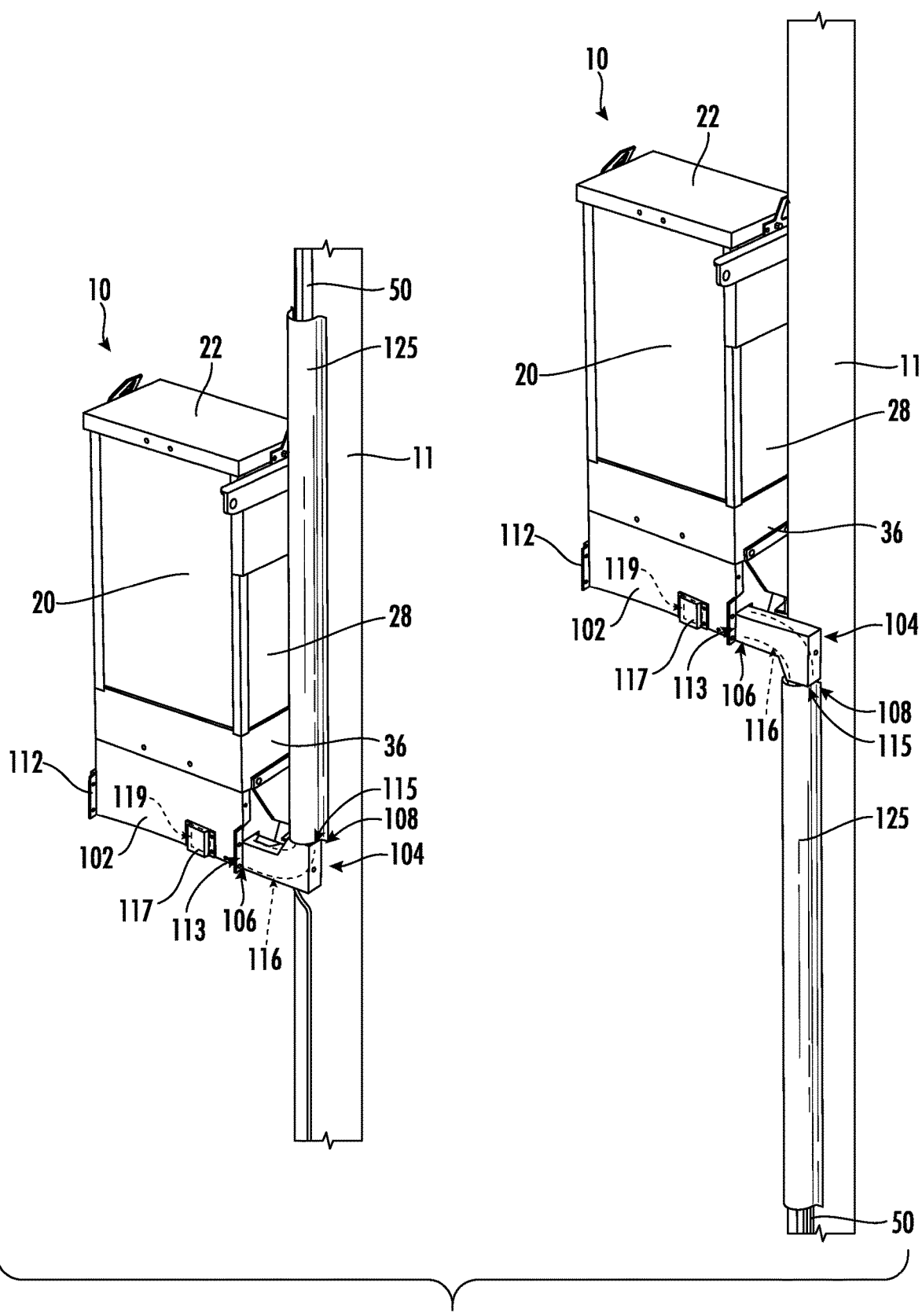

Referring now to FIG. 4C, directional spout 104 is coupled to side wall 103. In particular, first half 104A of directional spout 104 is coupled to side wall 103. Then, cables 50 are routed through portions of first aperture 110, passageway 116, and second aperture 115 as defined by first half 104A of directional spout 104. Second half 104B of directional spout 104 is then coupled to side wall 103 of cable protector 100 and coupled to the first half 104A of directional spout 104 to define first aperture 110, passageway 116, and second aperture 115 resulting in the configuration shown in FIG. 4D where second portion 108 is adjacent to pole 11. Moreover, in this configuration, passageway 116 is in communication with inner cavity 109 via opening 113. Referring back to FIG. 4C, directional spout 104 is oriented such that second portion 108 and second aperture 115 are directed in a direction towards cabinet 10. However, as shown, directional spout 104 can be rotated about first axis A1 such that second portion 108 and second aperture 115 are directed in a direction away from cabinet 10 as shown in FIG. 4D.

After directional spout 104 is installed onto side wall 103 and cables 50 are directed through passageway 116, a cable covering 125 is applied onto at least a portion of the remaining exposed portion of cables 50 that extend from directional spout 104. In this way, by applying cable covering 125, additional protection of cables 50 is afforded so that cables 50 cannot be accessed or damaged as shown in the configurations illustrated in FIG. 4E.

Figure 5A:
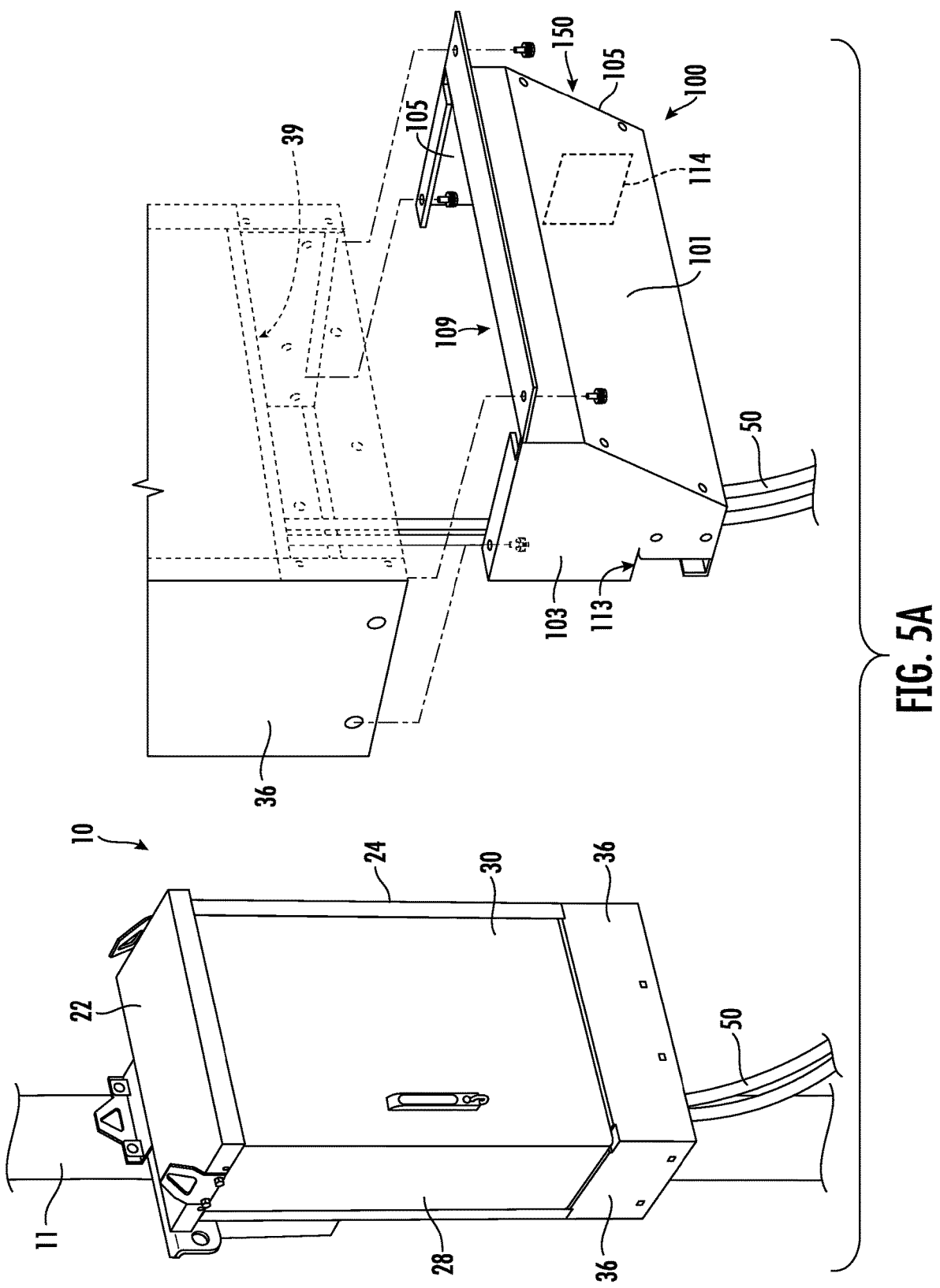
FIG. 5A-5E illustrate an alternate method of assembling the cable protection assembly of FIG. 2A onto the distribution cabinet of FIG. 3 in accordance with the present disclosure.
Figures 5B, 5C:
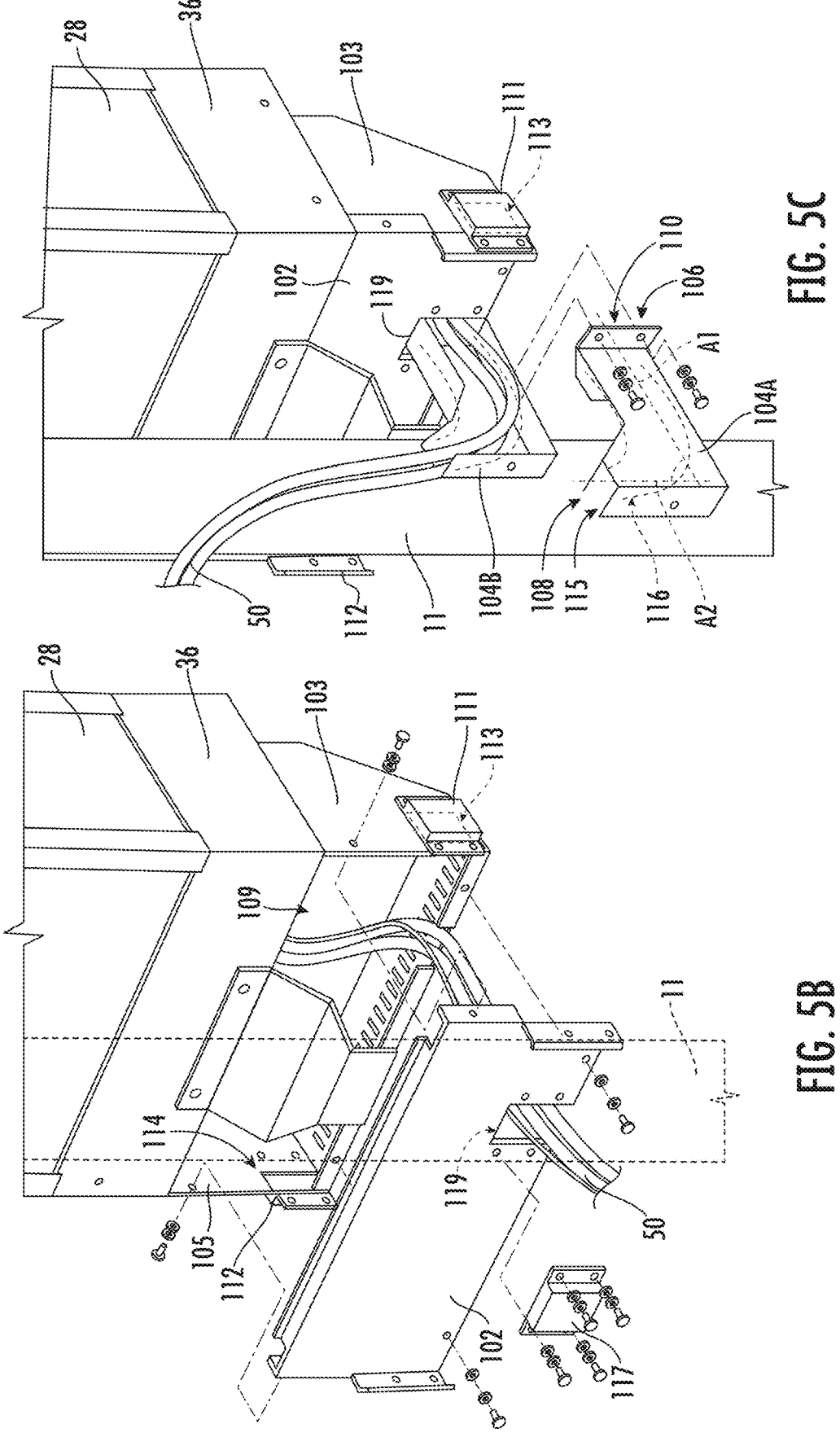

Referring now to FIGS. 5A-5E, an alternate method of assembling cable protection assembly 150 and connecting cable protection assembly 150 to cabinet 10 is shown. Referring first to FIG. 5A, cabinet 10 is rear mounted onto pole 11. As shown, cables 50 are extending downward from cabinet 10, and front wall 101 of cable protector is coupled to cabinet 10. In particular, a portion of top rim 101A that is defined by front wall 101 is coupled to cabinet 10. Then, as shown in FIG. 5B, removable plate 117 is removed from rear wall 102 to provide opening 119 through which cables 50 are then directed through. Rear plate 102 is then coupled to front wall 101 to define inner cavity 109 as mentioned previously.

Figure 5D:
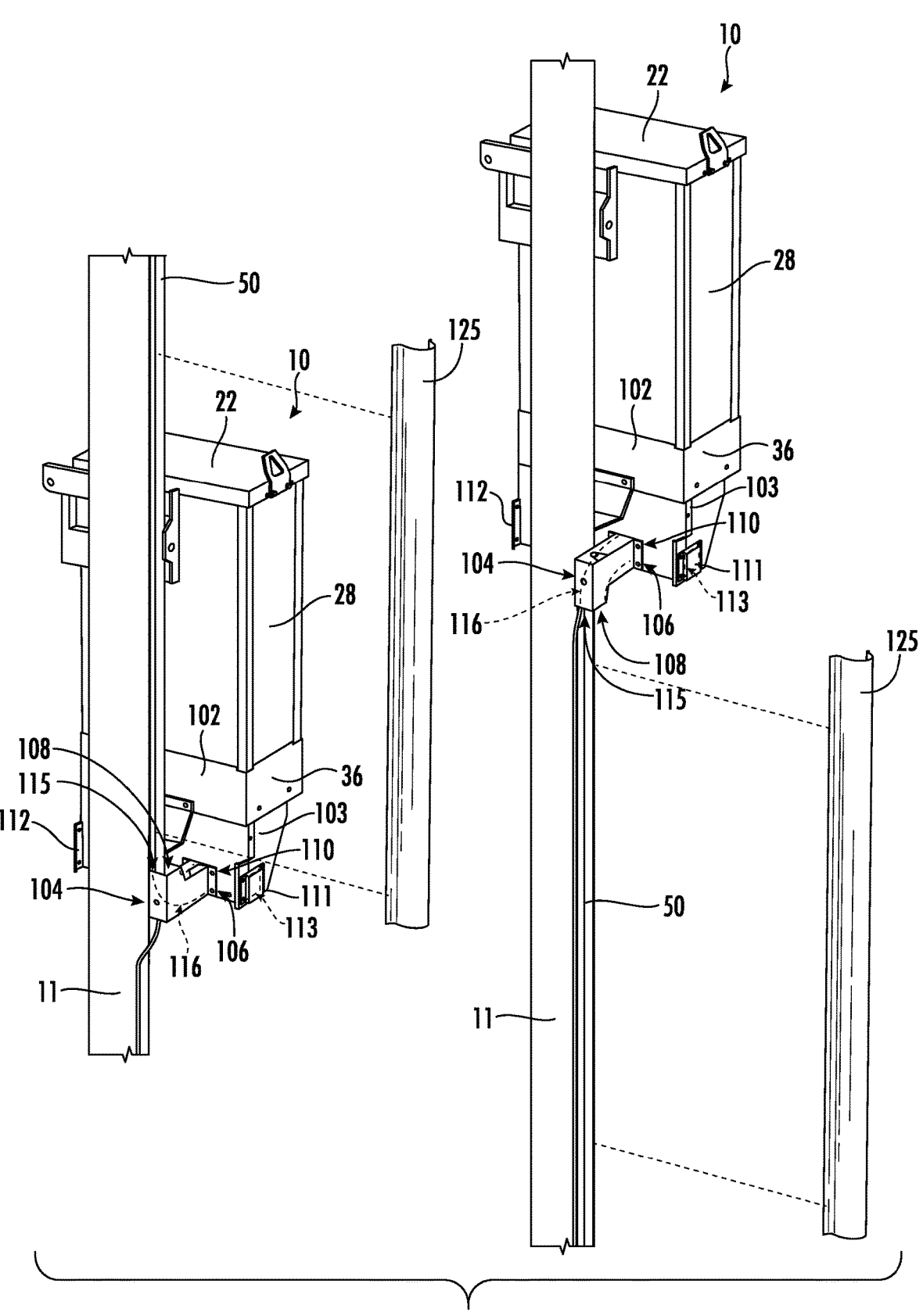
Figure 5E:
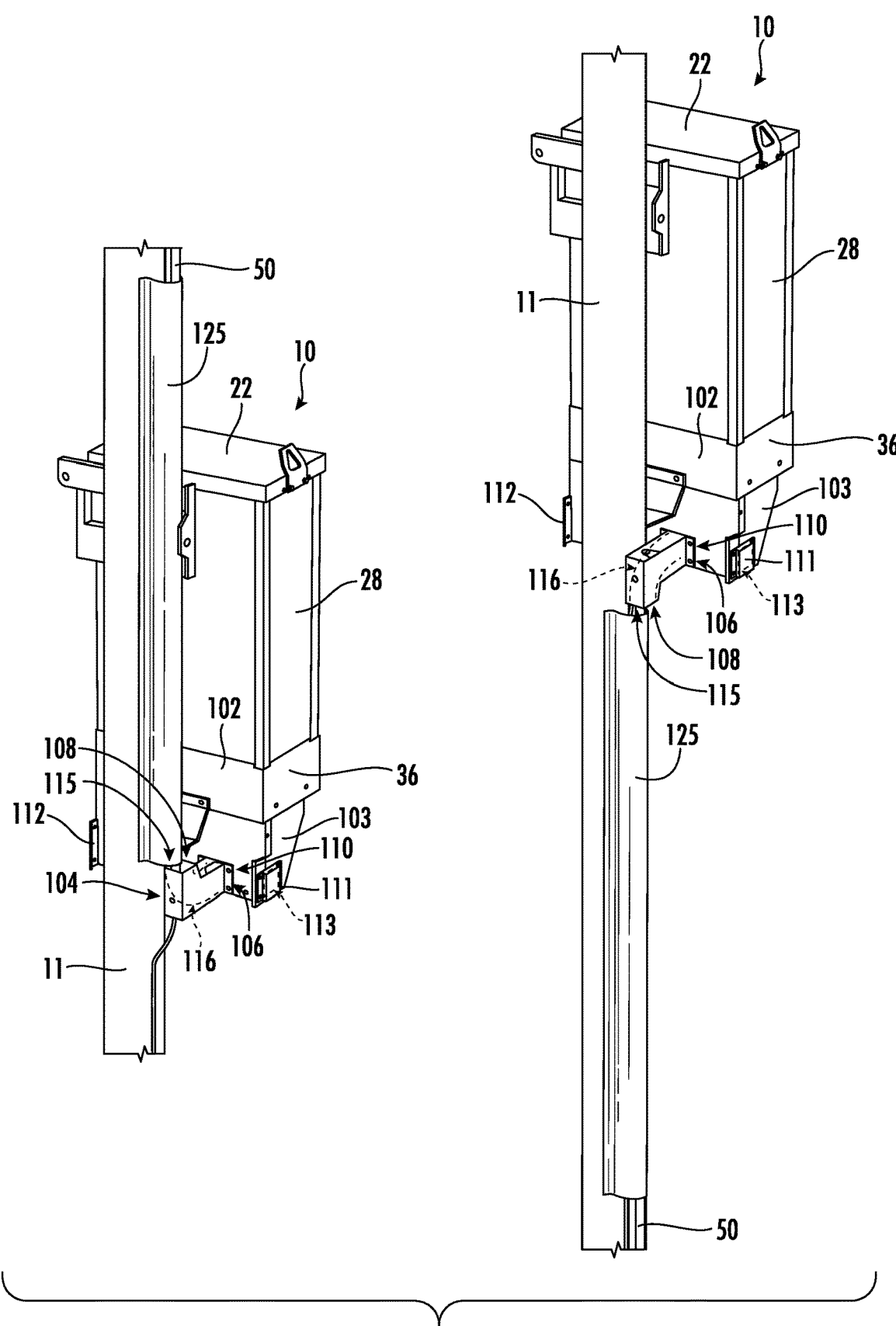

Referring now to FIG. 5C, directional spout 104 is coupled to rear wall 102. In particular, first half 104A of directional spout 104 is coupled to rear wall 102. Then, cables 50 are routed through portions of first aperture 110, passageway 116, and second aperture 115 as defined by first half 104A of directional spout 104. Second half 104B of directional spout 104 is then coupled to side wall 103 of cable protector 100 and coupled to the first half 104A of directional spout 104 to define first aperture 110, passageway 116, and second aperture 115 resulting in the configuration shown in FIG. 5D where second portion 108 is adjacent to pole 11. Moreover, in this configuration, passageway 116 is in communication with inner cavity 109 via opening 119. Referring back to FIG. 5C, directional spout 104 is oriented such that second portion 108 and second aperture 115 are directed in a direction towards cabinet 10. However, as shown, directional spout 104 can be rotated about first axis A1 such that second portion 108 and second aperture 115 are directed in a direction away from cabinet 10 as shown in FIG. 5D.

After directional spout 104 is installed onto side wall 103 and cables 50 are directed through passageway 116, a cable covering 125 is applied onto at least a portion of the remaining exposed portion of cables 50 that extend from directional spout 104. In this way, by applying cable covering 125, additional protection of cables 50 is afforded so that cables 50 cannot be accessed or damaged as shown in the configurations illustrated in FIG. 5E.

It will be apparent to those skilled in the art that various modifications to the preferred embodiments of the disclosure as described herein can be made without departing from the spirit or scope of the disclosure as defined in the appended claims.

Thus, the disclosure covers the modifications and variations provided they come within the scope of the appended claims and the equivalents thereto.

What is claimed is:

1. A cable protection assembly configured to connect to a cabinet, the cable protection assembly comprising:

a cable protector having a front wall, a first side wall, a second side wall, and a bottom wall, wherein one of the first side wall and the second side wall has a removable plate to create a first opening within the cable protector;

a rear wall coupled to the cable protector to define an inner cavity of the cable protector, wherein the rear wall has a removable plate to create a second opening within the rear wall;

a directional spout coupled to the rear wall, the directional spout having a first portion with a first aperture and a first axis and a second portion with a second aperture and a second axis, wherein the directional spout includes a passageway that extends between the first aperture and the second aperture and that is in communication with the inner cavity of the cable protector; and wherein the first axis and the second axis are angled with respect to one another.

2. The cable protection assembly of claim 1, wherein the front wall, the first side wall, the second side wall, and the rear wall define a top rim, wherein the top rim is configured to be coupled to a bottom surface of a cabinet.

3. The cable protection assembly of claim 1, wherein the first axis and the second axis are substantially perpendicular to each other.

4. The cable protection assembly of claim 1, wherein the first portion of the directional spout couples to the rear wall at the second opening within the rear wall.

5. The cable protection assembly of claim 1, wherein the second portion and the second aperture are positioned such that the second portion and the second aperture are directed in a direction away from the cabinet when the cable protection assembly is connected to the cabinet.

6. The cable protection assembly of claim 1, wherein the second portion and the second aperture are positioned such that the second portion and the second aperture are directed in a direction towards the cabinet when the cable protection assembly is connected to the cabinet.

7. A cable protection assembly configured to connect to a cabinet, the cable protection assembly comprising:

a cable protector having a front wall, a first side wall, a second side wall, and a bottom wall, wherein one of the first side wall and the second side wall has a removable plate to create a first opening within the cable protector;

a rear wall coupled to the cable protector to define an inner cavity of the cable protector, wherein the rear wall has a removable plate to create a second opening within the rear wall;

a directional spout coupled to one of the first side wall and the second side wall, the directional spout having a first portion with a first aperture and a first axis and a second portion with a second aperture and a second axis, wherein the directional spout includes a passageway that extends between the first aperture and the second aperture and that is in communication with the inner cavity of the cable protector; and wherein the first axis and the second axis are angled with respect to one another.

8. The cable protection assembly of claim 7, wherein the front wall, the first side wall, the second side wall, and the rear wall define a top rim, wherein the top rim is configured to be coupled to a bottom surface of a cabinet.

9. The cable protection assembly of claim 7, wherein the first axis and the second axis are substantially perpendicular to each other.

10. The cable protection assembly of claim 7, wherein the first portion of the directional spout couples to one of the first side wall and the second side wall at the first opening of one of the first side wall and the second side wall when the cable protection assembly is connected to the cabinet.

11. The cable protection assembly of claim 7, wherein the second portion and the second aperture are positioned such that the second portion and the second aperture are directed in a direction away from the cabinet when the cable protection assembly is connected to the cabinet.

12. The cable protection assembly of claim 7, wherein the second portion and the second aperture are positioned such that the second portion and the second aperture are directed in a direction towards the cabinet when the cable protection assembly is connected to the cabinet.

13. A method of assembling a cable protection assembly, the method comprising:

coupling a cable protector to a distribution cabinet;

wherein the cable protector has a front wall, a first side wall, a second side wall, and a bottom wall, wherein one of the first side wall and the second side wall has a removable plate to create a first opening within the cable protector;

coupling a rear wall to the cable protector;

wherein the rear wall couples to the cable protector to define an inner cavity of the cable protector, wherein the rear wall has a removable plate to create a second opening within the rear wall; and orienting a directional spout prior to coupling the directional spout to one of the rear wall and the cable protector;

wherein the directional spout comprises:

a first portion with a first aperture and a second portion with a second aperture, wherein the directional spout includes a passageway that extends between the first aperture and the second aperture; and coupling the directional spout to one of the rear wall and the cable protector.

14. The method of claim 13, wherein the second portion and the second aperture are positioned such that the second portion and the second aperture are directed in a direction away from a bottom wall.

15. The method of claim 13, wherein the second portion and the second aperture are positioned such that the second portion and the second aperture are directed in a direction towards a bottom wall.

16. The method of claim 13, further comprising:

directing a cable from the distribution cabinet through the cable protector and through the directional spout.

17. The method of claim 16, further comprising:

applying a cable covering onto an uncovered portion of the cable.

18. The method of claim 13, wherein the first portion of the directional spout couples to the rear wall at the second opening within the rear wall.

19. The method of claim 13, wherein the directional spout is coupled to one of the first side wall and the second side wall such that the first portion of the directional spout couples to one of the first side wall and the second side wall at the first opening of one of the first side wall and the second side wall.

20. The method of claim 13, wherein the first portion of the directional spout has a first axis and the second portion of the directional spout has a second axis; and wherein the first axis and the second axis are angled with respect to one another.

\*  \*  \*  \*  \*